US00RE37253E

(19) United States
(12) Reissued Patent
Moren et al.

(10) Patent Number: US RE37,253 E
(45) Date of Reissued Patent: Jul. 3, 2001

(54) PACKAGING FOR FRAGILE ARTICLES WITHIN CONTAINER

(75) Inventors: Michael S. Moren, Wheaton, IL (US); Fred Schindler, Santa Cruz, CA (US); Randall K. Loga, Hanover Park, IL (US)

(73) Assignees: Plastofilm Industries, Inc., Wheaton, IL (US); Roberts, Stevens, Van Amburg, Packaging, Inc., Soquel, CA (US)

(21) Appl. No.: 09/076,688

(22) Filed: May 12, 1998

Related U.S. Patent Documents

Reissue of:
(64) Patent No.: 5,515,976
Issued: May 14, 1996
Appl. No.: 08/516,761
Filed: Aug. 18, 1995

(51) Int. Cl.[7] ..... B65D 81/02
(52) U.S. Cl. ..... 206/586; 206/592
(58) Field of Search ..... 206/453, 522, 206/591, 592, 594, 586

(56) References Cited

U.S. PATENT DOCUMENTS

| | | | | |
|---|---|---|---|---|
| 3,047,142 | * | 7/1962 | Heffley | 206/453 |
| 3,334,798 | * | 8/1967 | Pezely, Jr. et al. | 206/594 |
| 3,356,209 | * | 12/1967 | Pezely, Jr. | 206/594 |
| 4,202,449 | * | 5/1980 | Bendt | 206/453 |
| 4,407,898 | * | 10/1983 | Kato et al. | 206/453 |
| 4,483,444 | | 11/1984 | Gardner . | |
| 4,705,170 | * | 11/1987 | Creaden | 206/593 X |
| 4,759,446 | * | 7/1988 | Dobashi et al. | 206/594 |
| 4,936,453 | * | 6/1990 | Knitter | 206/593 X |
| 5,226,543 | | 7/1993 | Foos et al. . | |
| 5,348,157 | | 9/1994 | Pozzo . | |
| 5,360,108 | | 11/1994 | Alagia . | |
| 5,385,232 | | 1/1995 | Foos et al. . | |
| 5,532,044 | * | 7/1996 | Jen | 206/587 |
| 5,628,402 | * | 5/1997 | Dickie et al. | 206/522 X |
| 5,755,331 | * | 5/1998 | Watson | 206/586 |

* cited by examiner

*Primary Examiner*—Jacob K. Ackun
(74) *Attorney, Agent, or Firm*—Greer, Burns & Crain, Ltd.

(57) ABSTRACT

A unitary structure for packaging a shock sensitive article within a container is provided. The structure has a side flange adapted to contact a side end portion of the article and a number of sidewall structures disposed about the periphery of the flange which extend over the side end portion of the article to contactingly support the article. Each of the sidewalls cushions the article against shocks by having an outboard wall which operably and supportingly contacts the container and a bridge section integral with the inboard wall and the outboard wall to cushioningly space the outboard wall from the inboard wall. The structure also includes a crush depression integral to the flange, inward of the sidewall and generally extending away from the article to supportingly contact a lateral sidewall of the container thereby forming a cushion distance. The crush button is configured to absorb shock loading of the article directed generally toward the sidewall.

20 Claims, 3 Drawing Sheets

PACKAGING FOR FRAGILE ARTICLES WITHIN CONTAINER

Matter enclosed in heavy brackets [ ] appears in the original patent but forms no part of this reissue specification; matter printed in italics indicates the additions made by reissue.

TECHNICAL FIELD

The present invention relates to packaging for fragile structures such as printed circuit boards, disk drives or the like. More particularly, the invention relates to a flexible, thermally formed type of plastic packaging, of unitary construction, which is adapted to hold such fragile articles and to dissipate forces exerted upon shipping cartons containing such articles in such a manner that the articles are not damaged if the carton is dropped or mishandled.

BACKGROUND OF THE INVENTION

Currently, the shipment of fragile articles, regardless of size and weight, requires special packaging to avoid damage to the articles. For this purpose, materials such as crumpled paper, nuggets of expanded foam, and/or preformed expanded polystyrene foam is used to package fragile articles, including but not limited to electronic articles such as computer CPUs, computer disk drives, VCR's and the like. The preformed polystyrene foam material is often provided in the form of "corners" or other support pieces which envelope at least portions of the packaged fragile article.

Aside from being bulky, upon an initial impact, the polystyrene foam loses virtually all of its shock absorbing qualities. Thus, fragile articles packaged with rigid pieces of expanded polystyrene foam as the protective media are susceptible to damage from repeated shocks to the box or container. A related disadvantage of such foam packaging is that a relatively thick piece of foam must be employed to protect a packaged article from impact, even though only a portion of the foam will be compressed upon impact. Also, shippers are required to select shipping containers, such as corrugated boxes, which are substantially larger than the article being packaged, merely to accommodate sufficient thicknesses of polystyrene foam which can absorb only one impact.

Another disadvantage of conventional polystyrene foam is that its bulkiness requires packagers to allot significant warehouse storage space to the foam packaging elements prior to use. Larger containers require additional warehouse space, both before and after assembly, and also take up more space per article shipped in rail cars or trailers.

Yet another disadvantage of conventional packaging for fragile articles is that because of its bulkiness, it is not generally economically feasible to ship the expanded polystyrene foam to a recycling location. Furthermore, even when the expanded polystyrene foam is recycled into product, the cost of recycling is relatively large and, generally, no more than about 25 percent recycled content can be utilized, with the remainder being virgin material. Indeed, considering the great quantity of expanded polystyrene foam which is currently in use to provide fragility packaging and the general lack of adequate recycling of this material, the adverse environmental impact is of staggering proportions. The present invention is directed to overcoming one or more of the above-identified problems.

Commonly-assigned U.S. Pat. No. 5,226,543 discloses a package for fragile articles which addresses the above-listed problems, and provides a solution in the form of a unitary package having a platform portion held a specified distance above the substrate by a peripheral wall formation which also borders the platform portion. Shock limiting formations are formed in the sidewall structure for restricting the movement of the platform portion toward the lower edge of the peripheral wall upon shock loading of the platform.

It has been found that for some applications, the amount of thermoformable material required for manufacturing the package is excessive, and results in an uneconomical solution to the above-identified packaging problem.

Accordingly, it is an object of the present invention to provide an improved unitary shock-resistant package for fragile articles which deforms to absorb shock loading. A related object is to provide such a package which recovers from such deformation after each shock loading to absorb additional shock loadings.

An additional object of the present invention is to provide an improved shock resistant package which reduces the space required for storing large numbers of these packages prior to their use.

Yet another object of the present invention is to provide an improved package which employs recyclable material while achieving the above-listed objects.

A still further object of the present invention is to provide a unitary shock-resistant package which economically employs thermoformable material while achieving the above-listed objects.

SUMMARY OF THE INVENTION

Accordingly, unitary structure for packaging a shock sensitive article within a container is provided. The structure has a side flange adapted to contact a side end portion of the article. Integrally connected to a peripheral portion of the flange is a peripheral sidewall structure with the sidewall structure having an inboard wall extending over the side end portion of the article to contactingly support the article. The sidewall cushions the article against shocks by having an outboard wall which operably and supportingly contacts the container and a bridge section integral with the inboard wall and the outboard wall to cushioningly space the outboard wall from the inboard wall. The bridge section resiliently restricts the movement of the inboard wall toward the outboard wall to dissipate the shock loading. The structure also includes at least one crush depression integral to the flange and generally extending away from the article to supportingly contact a sidewall of the container thereby forming a cushion distance. The crush depression is configured to absorb shock loading of the article toward the sidewall of the container.

Preferably, two of the structures are disposed within the container to contactingly support opposite side portions of the article and suspend the article from the longitudinal sidewalls of the container. Also each of the structures has a plurality of sidewall structures integrally connected to the peripheral edges of the flange and spaced from each other so that each of the sidewalls may independently absorb shock loading of the article. The number and arrangement of the sidewalls is typically predicated by the configuration of the article. Each of the sidewalls may be uniquely configured to adjust the resiliency of the sidewall to improve the shock loading characteristics of the sidewall.

An alternate embodiment of an unitary structure for packaging shock sensitive article is also provided. In the alternate embodiment, at least one foldable flap is attached to a distal end portion of one of the peripheral sidewall structures. The flap includes a planar portion and a shock absorbing protrusion extending outward from the planar portion. When the flap is placed in the folded position, the flap extends along the underside of the sidewall structure with the shock absorbing protrusion and the crush depressions contactingly engaging the sidewall of the structure to facilitate the shock cushioning characteristics of the structure.

DESCRIPTION OF THE PREFERRED EMBODIMENTS

Figure 1:
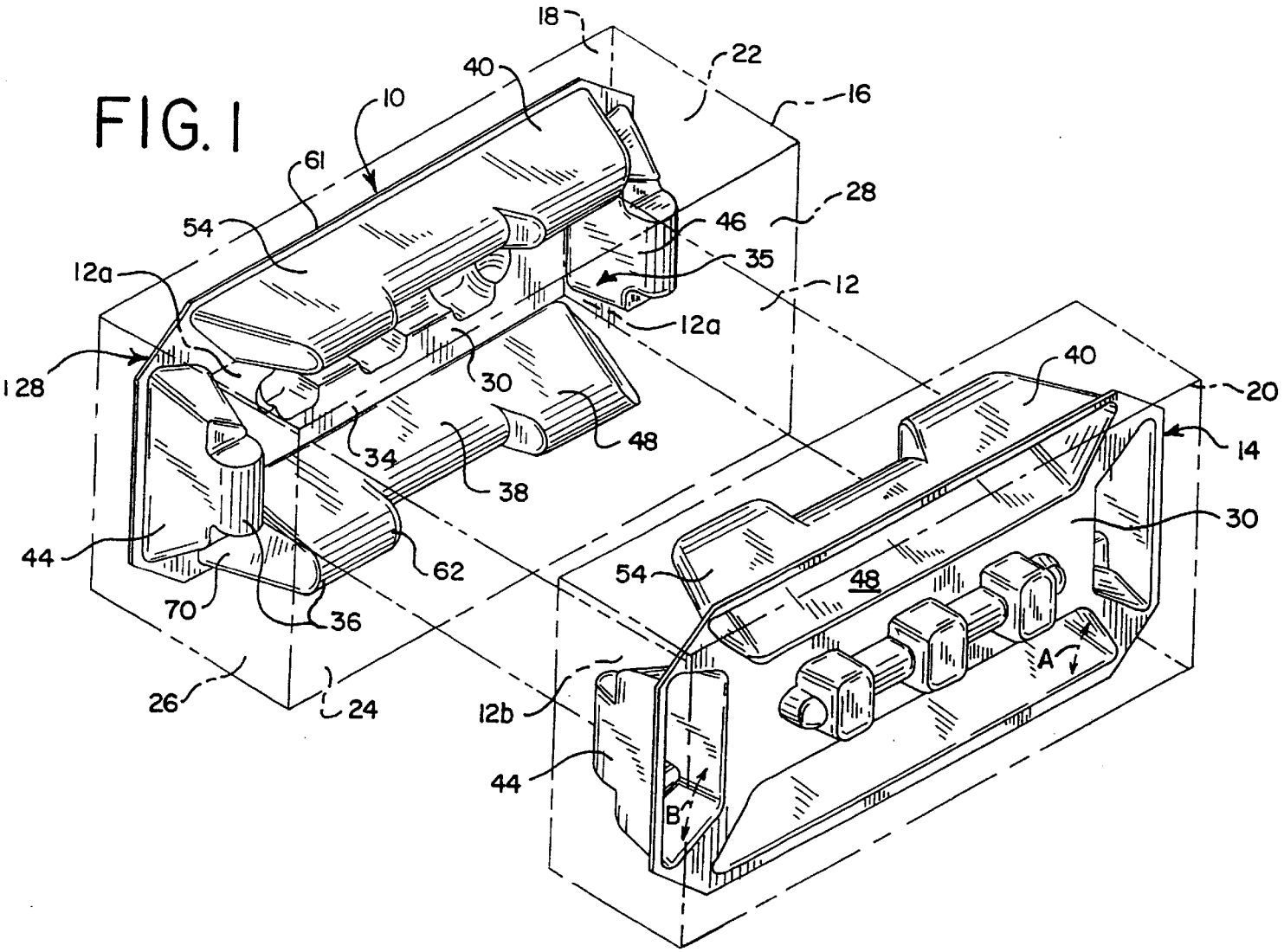
FIG. 1 illustrates, in a top perspective view, an article located in an enclosure in a form of packaging constructed in accordance with the embodiment of the invention, and also having a package of the invention positioned along an opposite side of the article.

The preferred embodiment of the present invention provides [an] *a* unitary packing structure 10 [is] *as* shown in FIG. 1. As illustrated, the unitary packing structure 10 is adapted to support and hold a lateral end portion 12a of a shock sensitive article 12 such as a laptop computer or the like. The packaging structure 10 and a second packaging structure 14 for holding an opposite lateral end portion of 12b the article 12, will normally be positioned within a container 16 such as a box or corrugated carton. The container 16 is formed with lateral sidewalls 18 and 20. Extending between the sidewalls 18 and 20 are a top wall 22, bottom wall 24 and longitudinal sidewalls 26 and 28. The packaging structures 10, 14 are preferably positioned to contact the lateral sidewalls 18, 20, and the walls 18–28 are shown in a relatively tight fitting arrangement about the packaging structures 10, 14 and article 12. Furthermore, it is contemplated that with articles 12 having end portions 12a, 12b of similar configuration and dimensions, the packaging structure 14 will be similarly constructed to packaging structure 10 but oriented in the opposite direction, as shown in FIG. 1.

The structure 10 is in the general form of a vertically oriented tray having a vertically extending central flange 30 which is adapted to contact and support the article 12 against lateral movement. The flange 30 has a peripheral edge portion 34 which is attached to at least one sidewall structure 36 forming part of the packing structure 10. The sidewall structure 36 forms at least a portion of an enclosure 35 which, when viewed from the direction in which the article 16 extends, is generally configured in the shape of the end portion 12a of the article. Such shapes may take the form of a polygon or of [a] *an* arcuate structure such as a circle or ellipse.

When the end portion 12a of the article 12 is a rectangular configuration, an upper sidewall 40 may be formed similar to a lower sidewall 38 but in a reverse orientation to the lower sidewall and integral with the peripheral edge 34 at the other side of the flange 30 from the lower sidewall. Also forming portions of the enclosure 35 is a forward sidewall 44 along and integral with the forward side of the peripheral edge 34 of the flange 30 and a rear sidewall 46 positioned on the other side of the flange from the forward sidewall. The enclosure 35 formed by the sidewalls extends about the end portion 12a of the article 12 to hold the article in a suspended relationship relative to the container [12] *16*.

The forward and rearward sidewalls 44, 46 are configured differently from the lower and upper sidewalls [36] *38*, 40. As is described below, the difference in configuration is important in the dissipation of the shocks applied to the package. Also the packaging structure conforms to the shape of the end portion 12a of the article 12 to reduce the size of the packaging structure. However, components and features which are shared by the sidewalls 38, 40, 44, 46 have been designated with identical [references] *reference* numerals.

Figure 2:
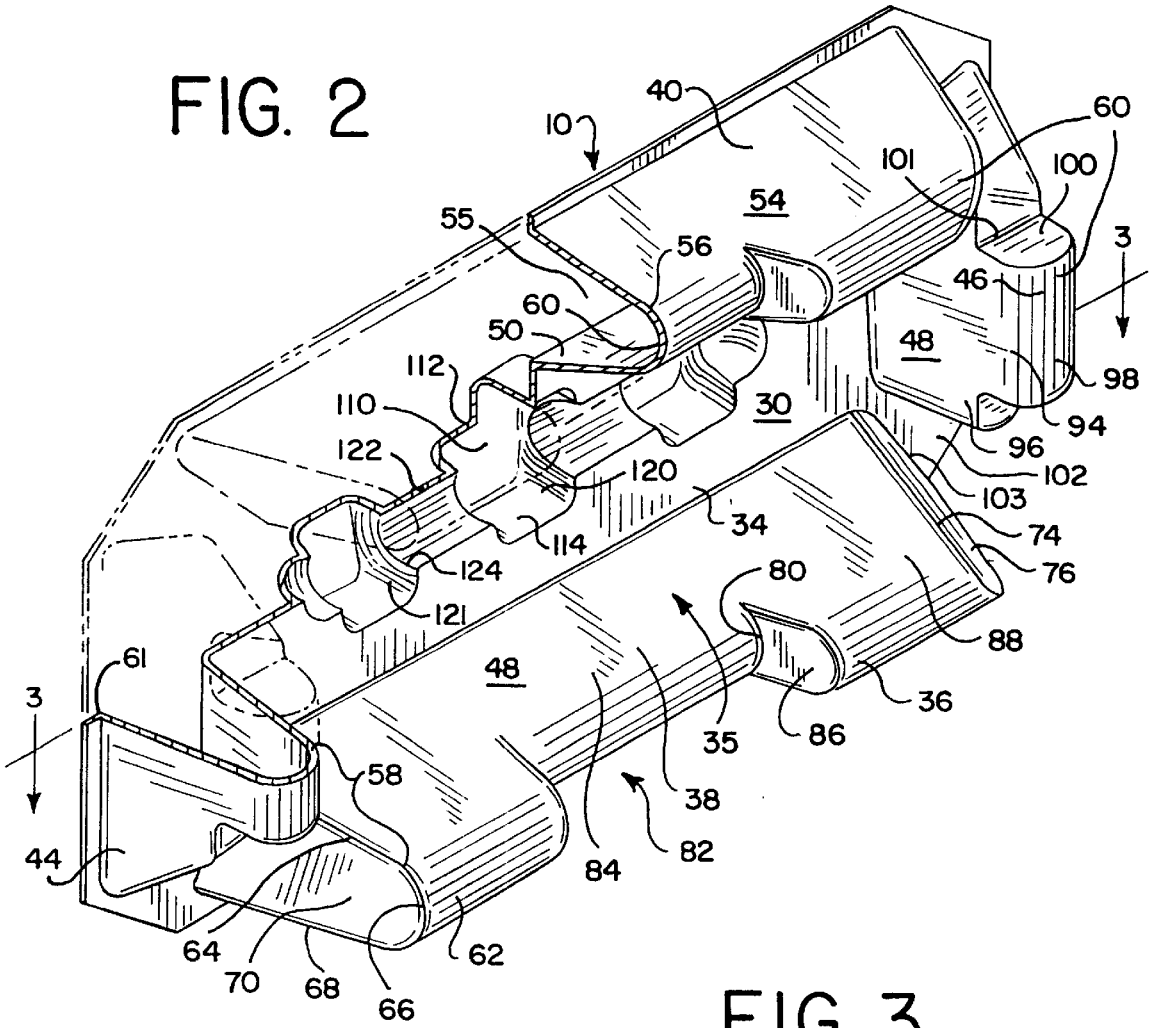
FIG. 2 illustrates, in a perspective view of the present packaging structure taken similar to the view of FIG. 1 with a portion shown cut away.
Figure 3:
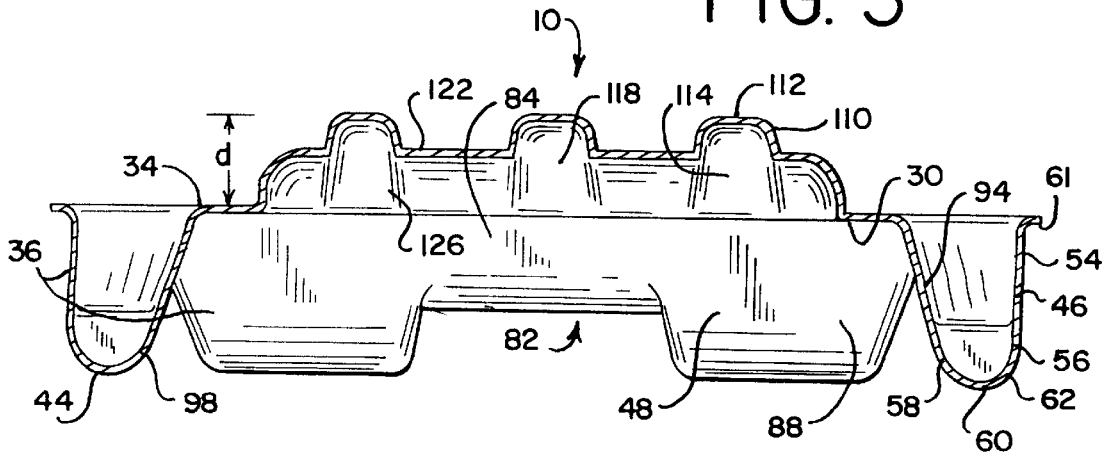
FIG. 3 is a sectional view taken generally along the line 3—3 of FIG. 2 and in the direction indicated generally.

Referring also to FIG. 2, the sidewall structures 38–46 have an inner wall 48 with a distal end portion 50 which is integral with the peripheral edge portion 34 of the flange 30. The inner wall 48 extends [inward] *inwardly* from the flange 30 and about the end portion 12a of the article 12. The sidewall structures 38–46, have outer walls 54 which are spaced from the inner walls 48 to form a hollow cushion spacing 55. A proximal end 56 of the outer wall 54 is joined to a proximal end 58 of the inner wall 48 by a transverse bridge section 60. Referring back to FIG. 1, a distal end portion 61 of the outer wall 54 supportingly contacts the top wall 22, bottom wall 24 and front and back sidewalls 26, 28 of the container 12. As best shown in FIG. 3, preferably the distal end portion 61 is vertically aligned with the flange 30. The inner wall 48 and outer wall 54 are formed with a slight draft as the walls extend inward, so that a number of packaging structures 10 may be nestingly stacked during storage.

To allow shocks to be dissipated through the structure 10, the structure is formed of a flexible, resilient, preferably polymeric material. The shocks are primarily dissipated by the flexibility and resiliency of the bridge section 60 which forms a biasing and dampening arrangement 62 to maintain the cushion separation of the outer wall 54 from the inner wall 48 during shock loading. Should shock loading of the article 12 cause a force to be applied by the article on the inner wall 48 thereby deforming the inner wall and moving the inner wall toward the outer wall 54, the flexing and resiliency of the bridge section 60 causes the bridge section to apply an opposing biasing force on the inner wall to dissipate the shock loading force.

In addition, after flexing, the resiliency of the material causes the inner wall 48 and outer wall 54 to return or recover to their original shape and position. An advantage of this flexibility and resiliency is that the present packaging structure 10 may absorb repeated shock impacts without deteriorating. Preferably the bridge section 60 is formed with an arcuate, generally semicircular [cross sectional] *cross-sectional* configuration so that the flexing of the bridge is spread over the length of the bridge. The bridge section 60 may also be formed with planar portions.

Any of a number of polymeric materials can be utilized to form the unitary packing structure 10. Generally such materials will *be* characterized by the physical properties of durability, elasticity, or "memory", high and low stability, and thermoformability. Particularly useful for forming the unitary packing structure 10 is high density polyethylene (HDPE), although other polymeric materials may be equally suitable, depending upon the application. High density polyethylene generally has a stiffness of about 150,000 PSI. This provides sufficient flexibility for the purposes of the present invention and sufficient resiliency so that the packaging structure 10 returns or recovers to its original loaded or less stress state following absorption of a shock. If desired, the HDPE used in making the packaging structure 10 may be recycled, post-consumer material.

It will be noted that the end portion 12a of the shock sensitive article 12 is in a relatively tight fit against the inner walls 48 of the lower sidewall 38, upper sidewall 40, forward sidewall 44 and rearward sidewall 46. Indeed, for better shock protection, it is preferred that the inner walls 48 be adapted and integral with the peripheral edge portion 34 of the flange 30 to pressingly engage and hold the article 12 when the article is positioned within the sidewalls.

It will also be noted that with the lower sidewall 38, upper sidewall 40, forward sidewall 44 and rearward sidewall 46 forming the enclosure 35 which surrounds the end portion 12a, shocks which are applied to the article 12 in a direction generally parallel to the flange 30, such as by dropping the container 16, will be primarily absorbed and dissipated by the flexure and resiliency of the bridge section 60 and inner and outer walls 48, 54 of one or more of the sidewalls.

Referring to FIG. 2, the lateral edge 64 of the inner wall 48, lateral edge 66 of the bridge section 60 and lateral edge 68 of the outer wall 54 are integral with and connected to end faces 70.

Referring back to FIG. 2, it has also been found that the greater the longitudinal length of a wall such as the outer wall 54 or inner wall 48, the greater the flexibility and less resiliency of a portion of the wall the farther that portion is away from the lateral edges 64, 68 of the wall. For example, the midpoint of the inner wall 48 or outer wall 54 between the lateral edges 66, 68 typically is the most flexible and has the least resiliency. In certain instances the portion may have too much flexibility to absorb shocks. Thus, in the preferred embodiment, intermediate resilient strength corners 80 are formed in the lower sidewall and upper sidewall 40 by forming a notch 82 in a middle portion 84 of the sidewalls. The strength corners 80 are defined by the connection between intermediate faces 86, which are integrally connected to and extend between the inner wall 48, outer wall 54 and bridge section 60, and the bridge section 60 of the notch 82.

The packaging structure 10 is [preferable] *preferably* thermoformed from a sheet of polymeric material which is transformed into the packing structure. The sheet would generally *be* from 10 to about 90 gauge (MILS) in thickness. In addition to thermoforming, it is contemplating that the packaging structure 10 may also be produced by injection molding. Regardless of the method of manufacturing, the particular thickness of the polymeric material making up the sidewalls 38, 40, 44, and 46 is a function of the specific properties of the polymeric material itself and the weight and shape of the shock sensitive article.

As is well known, in the typical thermoforming process the thickness of the various components of the article is dependent on the initial thickness of the sheet of polymeric material and also the surface area of the component which is formed from that sheet. For example, in the packaging structure 10, the farther inward a sidewall, such as the upper sidewall 40, extends from the flange 30 the more surface area of the sidewall. The more surface area, the thinner the sidewall becomes. As the walls become thinner, the flexibility increases and the resiliency tends to decrease. Therefore, in the preferred embodiment, the lower sidewall 38, upper sidewall 40, forward sidewall 44 and rearward sidewall 46 are uniquely configured to vary the thickness of the material along the length of the sidewall thereby enhancing the shock absorbing characteristics of the packaging structure 10. For example, as noted above, a middle portion 84 of the upper and lower sidewalls 38, 40 tends to have greater flexibility and less resiliency than end portions 88 of those sidewalls. By forming the notch 82, the middle portion 84 extends inward from the flange 30 for less distance than the end portions 88. Thus, the inner wall 48 and outer wall 54 of the middle portion 84 is typically thicker than the inner wall 48 and outer wall 54 of the outer portions 88 which decreases the elasticity and increases the resiliency and shock absorbing characteristics of the middle portion 84.

When packaging a shock sensitive article 12 having a plank like rectangular configuration, the forward sidewall 44 and rear sidewall 46 have a much shorter longitudinal length than the upper sidewall 40 and lower sidewall [36] *38*. The short longitudinal length places the two end faces in close proximity to each other potentially causing the inner wall 48 to be too rigid thereby lessening the shock absorbing characteristics of those sidewalls. To increase the flexibility of the inner wall 48, a middle portion 94 of the forward and rear sidewalls 44, 46 is extended inward a greater distance than the outer portions 96 and forms a middle shoulder 98. The increase in height of the middle portion 94 decreases the wall thickness of the middle portion thereby decreasing the resiliency and increasing the flexibility of the inner wall 48, outer wall 54 and bridge section 60 to enhance the shock absorbing characteristics.

The sides of the shoulder 98 are formed by intermediate faces 100 which are integrally connected to and extend between the inner wall 48, outer wall 54 and bridge section 60. Corners 101 are formed at the connection of the faces 100 and bridge section 60 of the sidewalls 44, 46. The corners 101 strengthens the forward and rear sidewalls 44, 46.

Referring to FIG. 2, the packaging structure 10 can be formed so that the lower sidewall [36] *38*, upper sidewall 40, forward sidewall 44 and rearward sidewall 46 may independently absorb shocks applied to the shock sensitive article 12 by being separated from each other by lands 102. The intersection of the lands 102 and end faces 70 also form resilient strength corners 103 to resiliently maintain the separation of the inner wall 48 from the outer wall 54 during shock loading of the article.

The lands may be aligned with the flange 30 preferably by being co-planar with the flange. It is also contemplated that the sidewalls, for example the lower sidewall [36] *38*, may be composed of one or more segments of sidewalls, separated by lands 102.

Referring to FIGS. 2 and 3, the packaging structure 10 is also formed with at least one crush depression or crush button 110 for absorbing shocks which are applied to the article 12 in a direction generally normal to the plane of the flange 30 or along the longitudinal length of the article 12. The crush button 110 is formed with lower end face 112 which is configured to contactingly engage the left lateral sidewall 18 (FIG. 1) and right lateral sidewall 20. The distance between the flange 30 and the sidewall 18 established by the button 110 defines a cushion distance "d".

The end face 112 is integrally connected to the flange 30 by a sidewall 114. For stability, the crush button 110 is located within the sidewalls [36] *38*, 40, 44, 46. The crush button 110 primarily dissipates shocks applied to the shock absorbing article 12 by flexing and deformation of the sidewall 114. The elasticity of the material forming the sidewall 114 allows the packaging structure 10 to accommodate repeated shocks.

The packaging structure 10 is preferably formed with three crush [button] *buttons* 110, *each* having a generally rectangular cross sectional configuration such that four rounded corners 120 extend from the flange 30 to the end face 112 for each button. The corners 120 form strength pillars 121 for increases strength. In addition, channels 122 may extend between adjacent buttons 110. At the juncture 124 of the channels 122 and crush buttons, additional strength corners 126 are formed to increase the strength of the buttons 110.

Referring now to FIG. 1, if an end portion 12a of an article is positioned within a unitary packing structure 10, and the opposing end portion 12b is placed within another such structure 14, and the combination of the packaging structure and shock sensitive article is placed in the container [14] *16*, a typical shipping arrangement will result. To facilitate the insertion of the packaging structure into the container [14] *16*, corner notches or radii 128 may be formed on all four corners.

If this arrangement is shocked, as by dropping it, there will be a resulting force downwardly upon the lower sidewall [36] *38*. In response to the force, the inner wall 48 will be forcefully flexed and forced toward the outer wall 54, which contacts one of the longitudinal walls 22–28, causing a flexing of the bridge portion 60. The force applied to the sidewall [36] *38* is then dampened and dissipated through the flexure and resiliency or the inner wall 48 and the exertion of the opposing force applied by the bridge section 60. After the force has been dissipated, the elasticity of the sidewall [36] *38* and resiliency of the bridge section 60 causes the sidewall to return to its original configuration.

Should the shock loading force by applied generally toward a lateral sidewall 18, 20, for example by dropping the container on an end, the sidewalls 114 of the crush buttons 110 may bow to absorb and dissipate the shock. After the shock has been dissipated the sidewalls 114 recover due to the resiliency.

Figure 4:
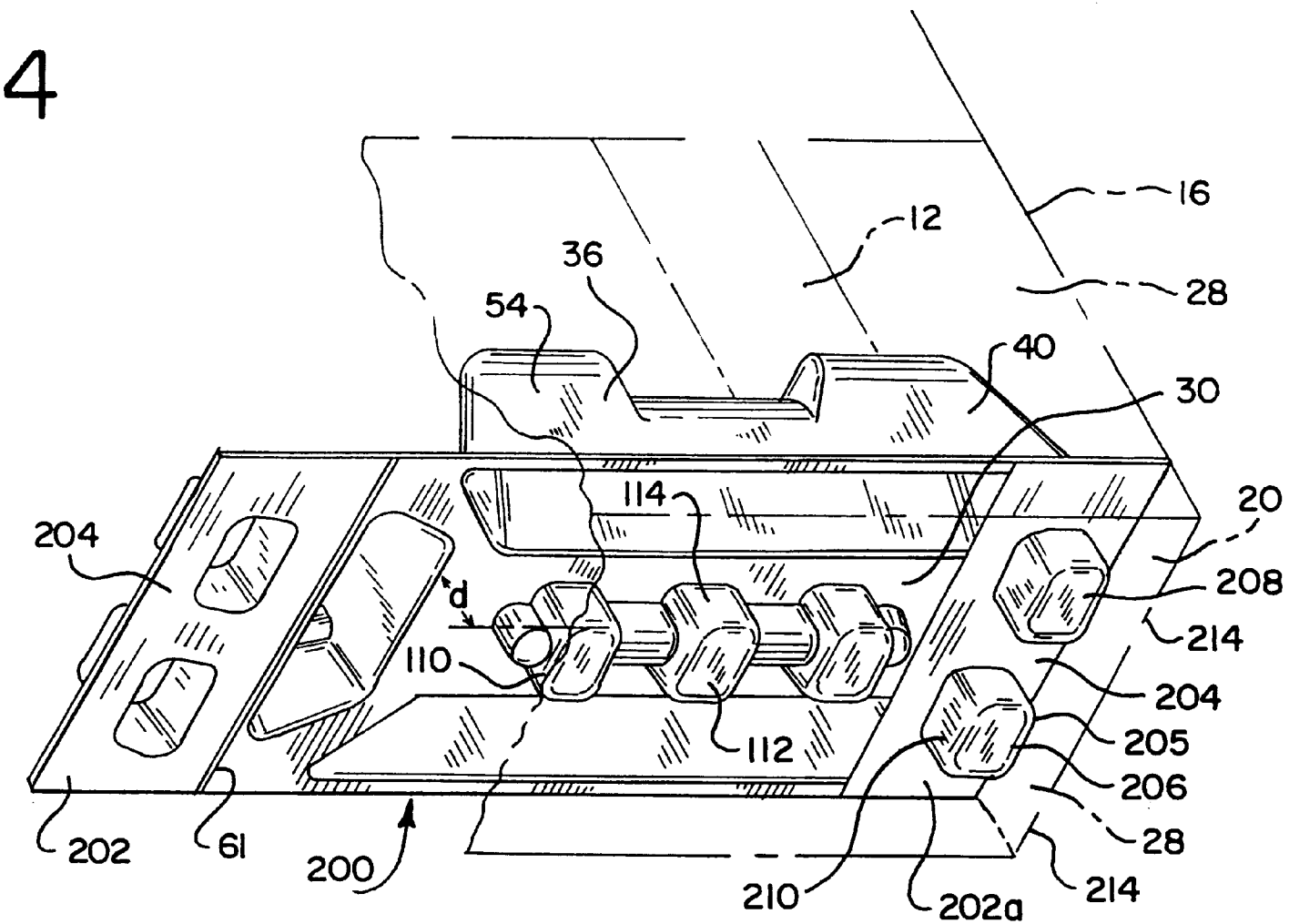
FIG. 4 is a perspective view similar to the view of FIG. 1, of an alternate embodiment of a form of packaging constructed in accordance with the invention.

Referring to FIG. 4, an alternate embodiment of the unitary packing structure is generally indicated at 200. The packing structure 200 is similar to the packing structure 10 (FIG. 1), but also includes at least one and preferably a plurality of foldable, shock absorbing flaps 202. The flap includes a planar leaf 204 integrally attached to at least one shock absorbing protrusion 205 such as crush button 206.

The flap 202 is preferably integrally and hingably attached to the distal end portion 61 so that it may fold from a first or straightened position, wherein the leaf 204 is generally co-planar with the flange 30, to a second or folded position 202a. In the folded position 202a, the leaf extends below *the flange 30* and the crush buttons 206 are positioned below one of the sidewall structures 36. Also, in the folded position 202a, crush buttons 206 and the crush buttons 110 contactingly engage the lateral sidewall 20 of the container 16 to establish the cushion distance d between the flange 30 and sidewall 20.

The crush buttons 206 may be similarly configured to the crush buttons 110 and include an end face 208 and sidewalls 210. For stability, the flap 202 is preferably formed with a plurality of crush buttons 206 which are eveningly distributed along the surface of the leaf 204. In addition, the leaf 204 is dimensioned and the crush buttons 206 are positioned so that when the flap 202 is folded, the crush buttons 206 are disposed between the crush buttons 110 and distal end 61.

Referring also to FIG. 2, the flap 202 may be attached to the distal end portion 61 adjacent any of the sidewalls 36, 40, 44, 46. Also, the packing structure 200 may be formed with one flap 202 or a plurality of flaps depending on desired shock absorbing characteristics. For example, the packaging structure 200 may include two flaps attached to distal portion 61 of opposite sidewalls 36. The flaps 202 provide additional cushioning against shock loading forces which are applied to container 16 at a location in close proximity to an edge 214 between two sidewalls such as sidewall 20 and longitudinal sidewall 28. The shock absorbing protrusion 205 may also be formed in other configurations such as a shape which mimics the configuration of the sidewall structures 36.

A specific embodiment of the novel packaging for fragile articles within a container according to the present invention has been described for the purposes of illustrating the manner in which the invention may be made and used. It should be understood that implementation of other variations, and modifications of the invention in its various aspects will be apparent to those skilled the art, and that the invention is not limited by the specific embodiment described. It is therefore contemplated to cover by the present invention any and all modifications, variations, or equivalents that fall within the true spirit and scope of the basic underlying principles disclosed and claimed herein.

What is claimed is:

1. A unitary structure for packaging a shock sensitive article within a container comprising:

a side flange having a peripheral portion;

a first peripheral sidewall structure of flexible material, said sidewall structure including an inboard wall integral with said peripheral portion and extending over [an end] *a* portion of the article, an outboard wall having a distal end and a proximate end, and a bridge section integral with said inboard wall and said proximate end of said outboard wall and spacing said outboard wall from said inboard wall to form a cushion space, said bridge section forming biasing means to resiliently restrict the movement of said inboard wall toward said outboard wall upon the shock loading of said article; and means for absorbing shock loading of the article generally in a first direction away from the article, said shock *absorbing* means including [a] *at least one* crush depression integral with said flange, and generally extending from said flange in the first direction to supportingly contact a [side]wall of the container and form a cushion distance.

2. The structure of claim 1 wherein said depression extends in the first direction relative to said flange for a greater distance than said distal end of said outward wall.

3. The structure of claim 1 further including a second peripheral sidewall structure extending over the end portion of the article, integral with said peripheral portion and separated from said first wall structure along said peripheral edge portion of said flange.

4. The structure of claim 3 wherein said structure includes lands integral with said peripheral portion, said lands generally aligned with and extending outward from said flange to separate said first peripheral wall from said second peripheral wall.

5. The structure of claim 3 wherein said second sidewall structure is integral with said edge portion on an opposite side of said flange from said first sidewall structure.

6. The structure of claim 5 wherein said *at least one* depression is formed between said first sidewall and said second sidewall.

7. The structure of claim 1 wherein said first peripheral wall includes lateral end faces integral with said inboard wall, said outboard wall and said bridge section.

8. The structure of claim 1 wherein the cushion space is hollow.

9. The structure of claim 1 wherein said first sidewall forms a notch along the length of said sidewall.

10. The structure of claim 9 wherein said notch is formed midway between end faces of said sidewall.

11. The structure of claim 1 wherein said first sidewall forms an elevated shoulder along the length of said peripheral wall.

12. The structure of claim 1 including at least one flap including a second crush depression, said flap being integrally attached to a distal end portion of said sidewall structure.

13. A unitary structure for packaging a shock sensitive article within a container comprising:

a side flange having a peripheral portion;

a plurality of peripheral sidewall structure of flexible material, said sidewall structures including an inboard wall integral with said peripheral portion with said sidewall structures arranged about the peripheral portion to form an enclosure about an end portion of the article, said sidewall structures including an outboard wall having a distal end and a proximate end, and a bridge section integral with said inboard wall and said proximate end of said outboard wall and spacing said outboard wall from said inboard wall to form a hollow cushion space, said bridge section forming biasing means to resiliently restrict the movement of said inboard wall toward said outboard wall upon the shock loading of said article;

lands extending outward from said flange to separate said sidewall structures [form] *from* each other; and a crush depression integral with said flange, inward of said first wall and generally extending in a first direction from said flange away from the article to supportingly contact a sidewall of the container and form a cushion distance, said [button] *crush depression* including means for absorbing shock loading of the article generally in the first direction.

*14. A packaging structure for packaging an article within a container comprising:*

*a flange for receiving a portion of the article, said flange defining a flange plane extending along the length thereof;*

*an outer flange for positioning said packaging structure within the container, wherein said outer flange is substantially coplanar with said flange plane and extends along an outer periphery of said packaging structure;*

*at least one sidewall portion attached to said flange and positioned between said flange and said outer flange, said at least one sidewall portion being configured and arranged to provide shock protection to at least a portion of the article when the article is positioned on a first side of said flange plane; and*

*at least one hollow crush button for providing shock protection to at least a portion of the article, said at least one crush button extending at least partially from a second side of said flange plane, wherein said second side is opposite to said first side;*

*said at least one sidewall portion forming an enclosure, with said flange and said crush button being positioned within said enclosure and said outer flange being positioned outside of said enclosure.*

*15. The packaging structure of claim 14 wherein said at least one crush button includes an end face, wherein when said packaging structure is secured by lateral sidewalls of the container, said end face is positioned closer to an endwall of the container than other portions of said packaging structure.*

*16. The packaging structure of claim 14 further including a plurality of crush buttons, with at least one channel extending between two of said crush buttons.*

*17. The packaging structure of claim 14 wherein said at least one crush button is of a generally polygonal shaped cross-section, and includes strength pillars formed at each corner thereof.*

*18. The packaging structure of claim 14 wherein said flange, said at least one sidewall portion and said at least one crush button are integrally formed from a single layer of material.*

*19. The packaging structure of claim 14 wherein said at least one sidewall portion has a particular resiliency, and said at least one sidewall portion also includes a notch formed therein for adjusting said particular resiliency of said at least one sidewall portion.*

*20. A packaging structure for packaging an article within a container comprising:*

*a flange for receiving a portion of the article, said flange defining a flange plane extending along the length thereof;*

*at least one sidewall portion attached to said flange, said at least one sidewall portion being configured and arranged to extend in a first direction along a side of the article and to provide shock protection to at least a portion of the article when the article is positioned on a first side of said flange plane; and*

*wherein said at least one sidewall portion includes a middle portion extending in said first direction between two shoulder portions, said middle portion being bounded in said first direction by two faces extending generally transverse to said first direction such that said middle portion has a height with respect to said flange plane that is greater than said two shoulder portions and said middle portion has a different resiliency than said two shoulder portions, wherein said different resiliency of said middle portion is created because said middle portion has a wall thickness that is different from a wall thickness of said shoulder portions.*

* * * * *